July 4, 1944.   B. WILLS   2,352,749
APPARATUS FOR APPLYING PLASTIC COATINGS
Filed Sept. 9, 1942   4 Sheets-Sheet 3
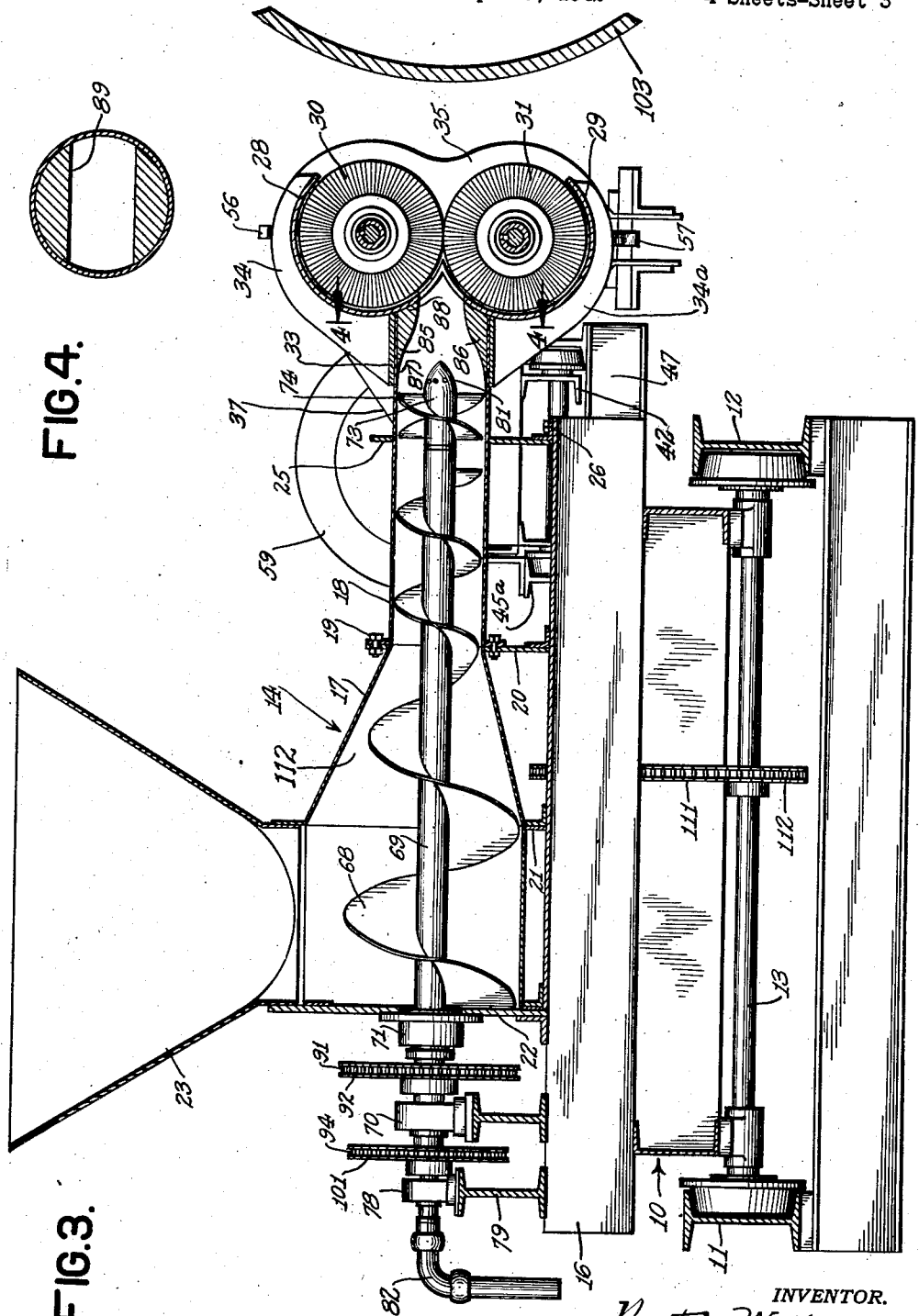
INVENTOR.
Barton Wills
BY John C. Kerr
ATTORNEY.

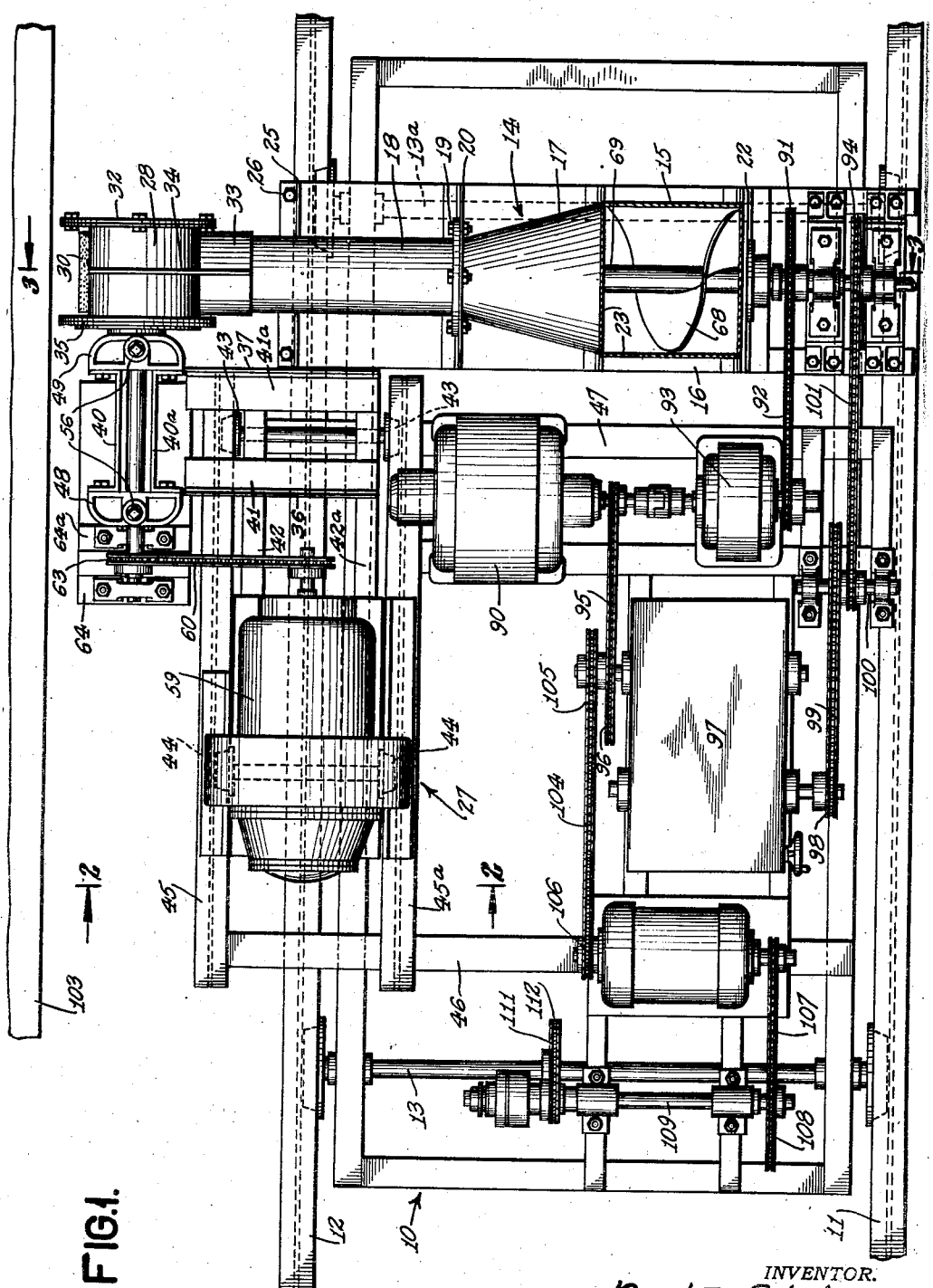

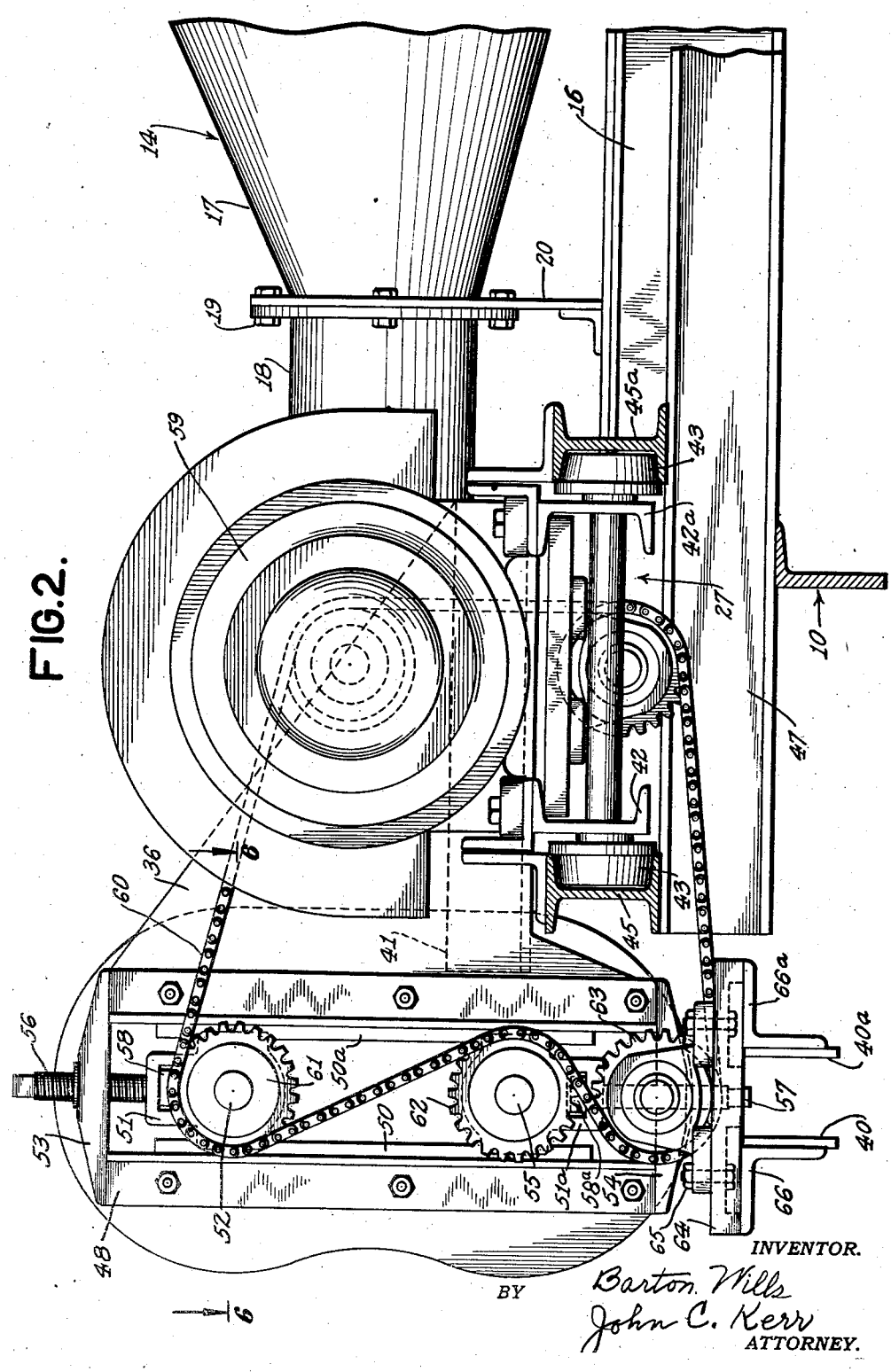

July 4, 1944.                    B. WILLS                    2,352,749
APPARATUS FOR APPLYING PLASTIC COATINGS
Filed Sept. 9, 1942                    4 Sheets-Sheet 4

INVENTOR.
BY Barton Wills
John C. Kerr
ATTORNEY.

Patented July 4, 1944

2,352,749

UNITED STATES PATENT OFFICE 2,352,749

APPARATUS FOR APPLYING PLASTIC COATINGS

Barton Wilk, East Orange, N. J., assignor to Lock Joint Pipe Company, East Orange, N. J., a corporation of New Jersey Application September 9, 1942, Serial No. 457,774

16 Claims. (Cl. 91—44)

This invention relates to apparatus for applying a coating to a surface, and more particularly for impelling concrete or other plastic material such as mortar or cement.

Among the objects of the invention is to provide an apparatus whereby concrete or mortar may be projected in a continuous stream of unvarying cross-section.

Another object of the invention is to provide apparatus employing rotary impelling elements in the form of cylindrical brushes and which is so constituted that the brushes may be readily removed from cooperation with the conveying portions of the apparatus to facilitate cleaning of the brushes and of the conveying portions of the apparatus.

Another object of the invention is to provide conveying devices for advancing a continuous supply of concrete or mortar to a throat formed between the cylindrical surfaces of rotating brushes and whereby the pressure exerted upon the moving mass of concrete entering the throat may be controlled to avoid any tendency to develop a pulsation in the flow of plastic material.

Another object of the invention is to provide a conveying arrangement for advancing plastic material through a conduit in which a plurality of worms are provided which are independently carried upon nesting tubes or hollow shafts whose bearings are mounted exteriorly of the conducting conduit, and with which devices may be provided for feeding fluids to the plastic material being conveyed through the conduit.

Another object of the invention is to provide a coating apparatus having provision for controlling the movement of the apparatus opposite a surface which is to be coated and in which the same provision controls the flow of plastic material being impelled from the apparatus.

Further and other objects of the present invention will be set forth in the accompanying specification and claims and demonstrated by the drawings which show by way of illustration a preferred embodiment and the principle of the invention, and what is now considered the best mode for applying that principle. Other embodiments of the invention employing the same principle are contemplated within the spirit of the appended claims and without departing from the present invention.

In the drawings:

Figure 1 is a plan of the general assembly of an apparatus employing the invention.

Fig. 2 is a section on line 2—2 of Fig. 1, showing particularly the mounting and drive for the rotary brushes in elevation.

Fig. 3 is a section on line 3—3 of Fig. 1 which is taken through the conveying conduit and rotary impelling elements.

Fig. 4 is a section on line 4—4 of Fig. 3.

Figure 5:
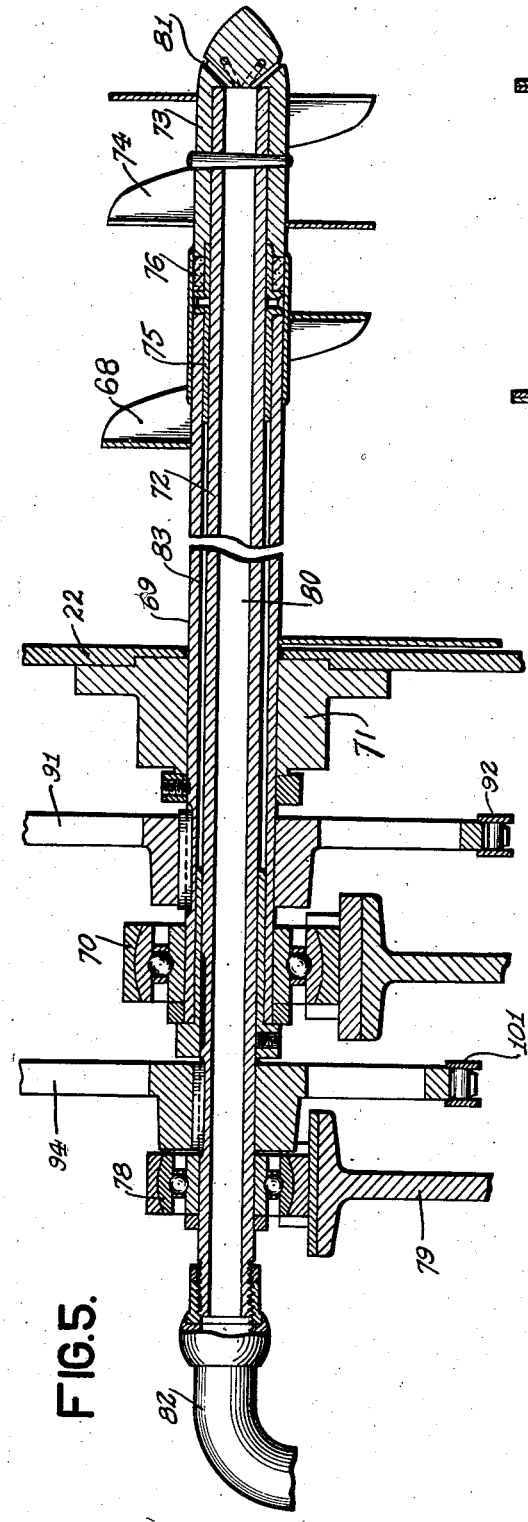
Fig. 5 is a longitudinal section through the worms by which plastic material is advanced.

The apparatus shown in the drawings utilizes a pair of cylindrical brushes for impelling concrete or other plastic material at a relatively high speed. These brushes are so mounted that their cylindrical surfaces receive concrete at one side of a locus between the brushes, and project the material from the other side of the locus. In accomplishing this the brushes are so mounted that their cylindrical surfaces at the locus move in the same direction and at the same speed. The locus may be generally identified as being located at the point of tangency between the cylindrical surface of the brushes or midway between the points of closest approach of these surfaces to each other, depending upon the adjustment of the brushes for particular conditions of operation. The surfaces of the brushes in the immediate vicinity of the locus and opposite the plastic material advancing on the brushes constitute a moving discharge throat which is adjustable for varying the depth of the stream projected by the brushes.

In order to obtain a substantially constant stream of material from such an apparatus it is necessary to provide a constant flow of material to the discharge throat formed by the brushes. A constantly rotating worm may be employed for providing a continuous flow of material to the brushes, but I have discovered that under certain conditions of operation, though such a worm or feeding device is operating under normal conditions, there develops a tendency to cause pulsations which affect the uniformity of the stream of plastic material delivered from the brushes and consequently the thickness of the layer of material formed on a receiving surface. This undesired result may be due to variations in pressure somewhere between the material-advancing worm and the discharge throat formed by the brushes, but whatever the cause, I have by the present invention succeeded in eliminating pulsations in the flow of concrete and thereby produced a uniform stream of plastic material from the brushes.

Inasmuch as the present apparatus is designed for applying a coating to the surface of a pipe, I have shown the same as being mounted upon a travelling carriage comprising a rectangular frame 10 which is supported upon a pair of rails 11, 12, by means of a truck structure including a pair of axles 13 and 13a and wheels at the ends of the axles. The plastic material conveying device or conduit 14 is mounted upon a pair of stringers 15, 16 which are carried by the rectangular frame 10.

The plastic material conveying device includes an enclosed passageway or conduit having a tapered portion 17 and a cylindrical portion 18 which is detachably secured to the tapered portion by means of bolts 19 which pass through flanges extending from the tapered and cylindrical portions, respectively. The tapered portion of the conduit is supported upon stringers 15 and 16 by brackets or plates 20, 21 and 22, with plate 22 forming an end wall of the conduit at its open or receiving end. The receiving end of the conduit has mounted thereon a hopper 23 by which material is introduced to the conduit.

The discharge end of the conduit is affixed to a supporting plate or bracket 25 and this bracket is anchored in place upon the stringers 15 and 16 by means of bolts 26. It will be seen from this construction that the cylindrical portion of the conduit can be removed from the remainder of the apparatus by removing bolts 19 and 26.

The discharge end of the conduit has a housing mounted thereon which includes two curved plates 28 and 29 that partly surround the peripheries of the rotating impelling elements or brushes 30, 31. The end portions of the curved plates 28 and 29 at the point of ingress of plastic material between the brushes are cut away to leave an opening with parallel upper and lower edges. This opening coincides with the restricted cross-sectional area of the conveying conduit adjacent the rotary brushes (Figs. 3 and 4). The housing also includes a cheek plate 32, Fig. 1, which faces and covers one side of the rotary brushes. The housing is secured to conduit 18 by means of a sleeve 33 which is removably attached to the conduit by bolts or set screws (not shown). Webs 34, 34a stiffen the housing centrally and contribute to secure the curved plates 28 and 29 to the sleeve.

Figure 6:
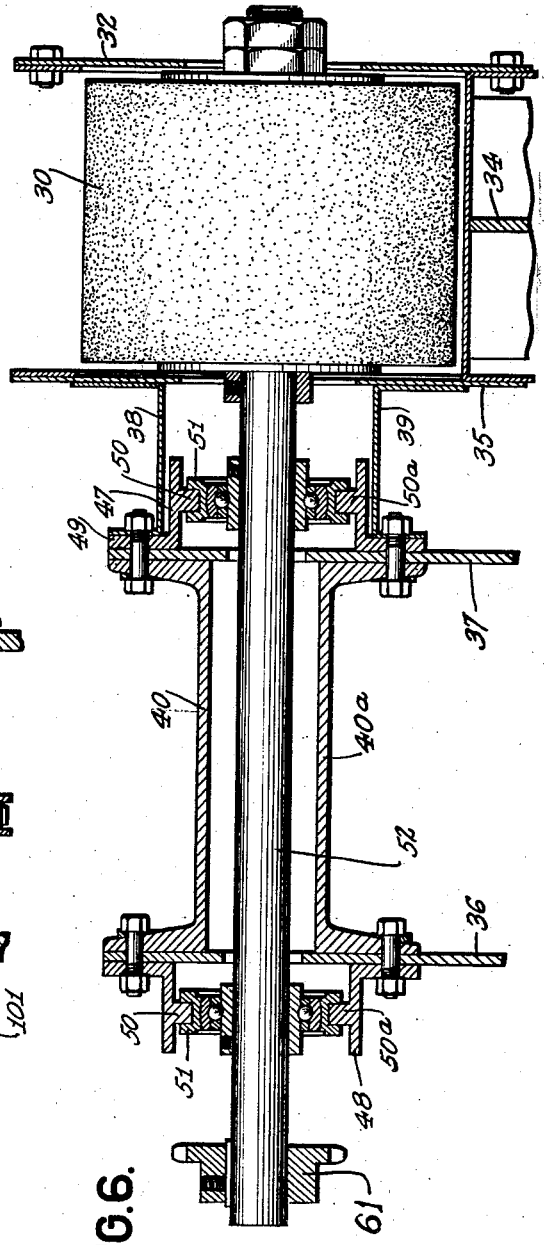
Fig. 6 is a horizontal section on line 6—6 of Fig. 2 showing the bearings, supports and housing for a rotary brush.

The side of the housing opposite from cheek plate 32 is covered by another cheek plate 35, Figs. 1 and 6. This latter cheek plate is removable from the housing along with the rotary brushes upon movement of a carriage or truck 27 for cleaning purposes.

Cheek plate 35 is supported from one of a pair of vertically-disposed triangular-shaped plates 36, 37 by two pairs of brackets, one pair of which, 38, 39, is shown in Fig. 6. Another pair of similar brackets (not shown) flank the lower brush-carrying shaft and are bolted in a similar manner to the triangular-shaped plate 37, and to the lower portion of cheek plate 35.

The triangular-shaped plates 36 and 37 are connected together by a pair of standards 40, 40a, and together therewith form a rigid box-like frame. This frame is carried by a carriage 27 (Figs. 1 and 2) by which the triangular-shaped plates 36 and 37 are supported. The triangular-shaped plates are secured to angle bars 41, 41a which are in turn secured to a pair of channel members 42, 42a, which constitute the side members of the supporting carriage 27. This carriage is provided with pairs of rollers 43 and 44 which rest on I-beams 45, 45a constituting tracks along which the carriage can be traversed when desired. The I-beams 45, 45a are carried by supporting beams 46 and 47 on the main carriage 10.

It is evident from the foregoing that the box-frame made up of the triangular-shaped plates 36 and 37 and the two standards 40, 40a, and all of the elements carried by said box-frame, may be shifted laterally from the conveying conduit 14 by movement of the small supporting carriage along its tracks. By moving the said box-frame to the left, Figs. 1 and 6, cheek plate 35 may be removed from the housing in the same operation that the impelling brushes are withdrawn from therein.

The box-frame, of which the triangular-shaped plates 36 and 37 constitute the supporting elements, serves to support a pair of guide frames 48, 49 by which the bearings for the brush-carrying shafts are supported and guided for movement towards and away from each other. A horizontal section through these frames is shown in Fig. 6 and one of the frames is shown in elevation in Fig. 2. The two frames are alike. The vertical members of each of them include rails 50, 50a for guiding the bearings 51, 51a in vertical movement. The bearings 51 at one end of the upper brush-carrying shaft 52 are suspended from a cross-piece 53 at the upper end of the frame in the manner illustrated in Fig. 2. A lower cross-piece 54 supports the bearings 51a at one end of lower brush-carrying shaft 55.

Each of the upper and lower cross-pieces of each frame has an adjusting screw 56, 57 threaded through a tapped hole and each adjusting screw has a mushroom head 58, 58a which engages a shoulder in each of the respective upper and lower bearings. By adjusting the vertical positions of the adjusting screws the brush-carrying shafts 52 and 55 may be moved towards or away from each other for the purpose of attaining the desired spacing of the brushes at the point of closest approach of their peripheries. This adjustment is provided in order to make correction for the wear of the brushes and also for adjusting the apparatus to deliver different mortars or concrete under the most efficient operating conditions. For a mortar mix of 1:1½, satisfactory results have been obtained with the peripheries of the brushes tangentially contacting. But for mortars containing coarse aggregate it is desirable to provide space between the peripheries of the brushes at their points of closest approach.

The brushes are driven by a motor 59 through a sprocket and chain connection 60. As illustrated in Fig. 2, the chain is trained over sprockets 61 and 62 in such a manner as to cause the shafts 52 and 55 to rotate in opposite directions. This is accomplished by means of an idler 63. This idler is carried by a pair of bearing blocks 64, 64a which have elongated slots for permitting adjustment of position of the idler laterally of the motor, whereby the correct tension in the chain may be obtained. The bases of the bearings for idler 63 are secured to bearing blocks 64, 64a by means of bolts with nuts 65 at their upper ends. The bearing blocks are mounted on angle irons 66, 66a which are secured to the lower ends of standards 40, 40a. Idler sprocket 67 is carried by carriage 27 and serves to clear sprocket chain 60 of track 45.

The conduit 14 through which plastic material is advanced towards the impelling brushes is provided with material-advancing mechanism comprising a worm 68 which is carried by a tubular member 69. The portion of this worm within the tapering conduit 17 is preferably tapered and the portion of the worm within the cylindrical conduit 18 is of uniform outside diameter. The worm-carrying member 69 is supported exteriorly of the conveying conduit 14 by means of a fixed bearing 70. Intermediate this bearing and the conduit 14 there is provided a flange unit 71 which engages the partition 22 at the feed end of the conduit.

Tubular member 69 contains a shaft 72 which has mounted upon its free end a hub 73 (Figs. 3 and 5) which carries one or more worms 74. The hub and associated worms are pinned to the shaft 72 and are rotated thereby. Shaft 72 is spaced from tube element 69, corresponding to the thickness of a bearing sleeve 75. This sleeve is secured to the shaft 72 and a packing element 76 is provided for sealing the joint between the hub 73 and the tubular element 69.

One end of the shaft 72 is supported in a bearing 78 which is carried by a short beam 79. This beam rests on stringers 15 and 16 on frame 10 (Figs. 1 and 3). It will be seen from the foregoing that tubular member 69 and shaft 72 are supported in cantilever fashion from points outside of the conduit 14 by means of bearings 71 and 78, respectively. The free ends of tubular member 69 and shaft 72 float freely within the conduit as these shafts are operating to advance plastic material through the conduit.

So far as the use of the invention thus far described is concerned, shaft 72 may be either solid or hollow, but preferably the shaft is provided with a bore providing a passageway 80 throughout its length by which water may be introduced into the concrete or other plastic material approaching the brushes for increasing the fluidity of the concrete, as desired. The hub 73 has a number of drilled holes 81 through which water can be delivered. When desired, fluid material for either increasing or retarding the set of mortar can be introduced to the mortar by the same means. Inasmuch as shaft 72 is rotated during the operation of the apparatus, the hose connection for conveying fluid to its interior is connected to a swivel elbow 82 secured to the end of the hollow shaft. Suitable passageways are provided for the lubrication of the bearings for the tube 69 and the hollow shaft 72 and the annular space 83 between the two can be kept filled with oil.

Hollow shaft 72 is intended to be operated at a speed different from that of tube 69. The function of the worms 74 which are driven by the hollow shaft 72 is to boost the pressure of the concrete within conduit 18 and immediately rearward of the discharge point of the conduit. By rotating the worms 74 at such a speed as will maintain a substantially constant pressure on the material entering the discharge throat between the rotary brushes, uniformity of discharge from the brushes can be maintained. The character of the stream impelled by the brushes can be readily detected either by acoustical or visual observation of any manifestation of vibration. In the event of any irregularity in the stream due to pulsating flow within conduit 18, correctional measures may be taken by varying the speed of rotation of worms 74 until the pulsations cease. In most cases increase in speed of worms 74 relative to worm 68 will remedy the irregularity.

I have further discovered that improved operation can be had by restricting the cross-sectional area of the conveying conduit in the vicinity of the rotary brushes. For accomplishing this I have provided two wedge-shaped members 85, 86 whose outer surfaces conform to the rounded interior of the conduit and whose inner surfaces are ramp-like and vary from a feathered edge 87 to the thickened portion 88 immediately adjacent curved plates 28 and 29. The effects of a nozzle are thereby produced. The interior surface 89 of each of these members is generated by a straight line parallel to the axis of the brushes to provide an efficient flow surface. The opposite flow surfaces are parallel in diametrical planes as shown in Fig. 4. I have found it convenient to make these wedge-shaped members as castings and bolt them to the conduit.

The brushes 30, 31 are preferably provided with steel bristles or other tough metallic bristles, but tough fibre or other equivalent material could be used. The ends of the bristles terminate in a cylindrical surface, as illustrated in Figs. 3 and 6. One effect of the ramp-like members 85, 86 is to present a ribbon of plastic material to the brushes and also to lessen the areas of the portion of the peripheries against which the plastic material is forced. Improved operating efficiency of the brushes is attained with their use.

The material-advancing worms 68 and 74 are preferably driven from a single motor. This motor 90 is carried on frame 10, together with other driving connections intermediate the motor and the worms. As illustrated in Figs. 1 and 3, tube 69 has a sprocket wheel 91 mounted thereon which is driven by a chain 92 engaging the output sprocket of a speed reduction mechanism 93. This speed reduction mechanism is directly driven from motor 90.

The outboard end of hollow shaft 72 has keyed thereto a sprocket wheel 94 whereby the hollow shaft is rotated. The drive for this sprocket wheel is from motor 90, chain 95, input sprocket wheel 96 to a Reeves variable speed mechanism 97, output sprocket wheel 98, chain 99, countershaft 100, and chain 101. From this driving mechanism it is clear that the speed of rotation of the shaft 72 and worms 74 can be varied at will independently of any given speed for tube 69 and worm 68.

The entire apparatus is designed for traverse along the wall of a pipe which is generally illustrated at 103. As thus far described, any usual form of power mechanism may be employed for moving the apparatus along its tracks 11 and 12, but inasmuch as the apparatus is particularly suitable for applying a coating of mortar or other plastic material to the wall of a pipe, it is important that the rate of application of the plastic material be carefully controlled. To accomplish that the travel of carriage 10 on tracks 11 and 12 is caused by means of the same motor 90 which provides power for feeding the plastic material to the brushes. A sprocket chain 104 passes over a sprocket wheel 105 which is keyed to and turns with sprocket wheel 96 which derives its drive from the motor. Sprocket chain 104 drives the input wheel 106 of a variable speed drive. The output gear of the variable speed drive engages a sprocket chain 107 which drives a sprocket wheel 108 carried by countershaft 109. This countershaft is mounted in bearings supported upon the carriage 10. A chain 111 receives the drive from the countershaft and engages a sprocket gear 112 carried by one of the carriage axles 13, Fig. 3.

In the operation of the apparatus, the conveying conduit is maintained full by an attendant who can easily gauge the quantity of plastic material required by observing and maintaining a "boiling back" of the plastic material through the space above the primary worm as at 112. When this condition of feed exists the worm is advancing its full capacity at the prevailing speed of rotation. In applying concrete or other plastic material, the two worms and the rotary brushes are placed in operation and the speed of rotation of the booster worms 74 is adjusted in order to eliminate any pulsating effect which might develop, as heretofore described. The quantity of plastic material being applied to a pipe surface is controlled primarily by the feeding effect of worm 68, which is kept loaded.

It is to be understood that apparatus is provided for rotatively supporting the core of the pipe. As the pipe is being rotated, the carriage upon which the apparatus is mounted is driven alongside the pipe on tracks 11 and 12. The combined effect of these operations is to apply a coating of uniform thickness to the exterior of the pipe by a stream of coating material which is laid in a helical path. The thickness of the coating may be increased by several passes of the coating apparatus alongside the rotating pipe.

At the conclusion of a day's work it is important that plastic material be cleaned from all of the mechanism. For obtaining access to the brushes, the brush supporting structure and the brush driving mechanism may be moved away from the conveying conduit 14 as a unit by moving carriage 27. This operation removes cheek plate 35 from the housing and withdraws the rotary brushes from within the housing so that the housing and brushes can be easily cleaned.

While the brushes are so withdrawn, the conduit 14 may be disassembled for cleaning purposes and to provide easy access to the worms 68 and 74. For this purpose cylindrical portion 18 of conduit 14 is detached from the tapered portion 17 by the removal of bolts 19, and by the removal of bolts 26 which secure the supporting bracket 25 to the stringers 15 and 16. When removed, the cylindrical portion of the conduit 18 can be easily cleaned. The free ends of the worms 68 and 74 are then readily accessible.

What is claimed is:

1. In apparatus for applying a plastic coating, the combination comprising a conduit for conveying plastic material, a pair of rotary impelling elements mounted at the discharge end of said conduit for receiving plastic material from said conduit and for discharging said material from therebetween, a worm for advancing plastic material through said conduit and towards said rotary impelling elements, a second worm in said conduit between said first worm and said rotary impelling elements, said second worm being located to receive plastic material from said first worm and to direct it against said rotary impelling elements, means to actuate said first worm, means whereby said second worm may be actuated at a speed different from the speed of said first worm, and means to actuate said rotary impelling elements to effect discharge of plastic material from said conduit.

2. In apparatus for applying a plastic coating, the combination comprising a conduit for conveying plastic material, a pair of rotary impelling elements mounted at the discharge end of said conduit for receiving plastic material from said conduit and for discharging the same from therebetween, a worm for advancing plastic material through said conduit in the direction of said rotary impelling elements, said worm being hollow through its center, a shaft nested within said worm, a second worm mounted on said shaft and located between said first worm and said rotary impelling elements, means to actuate said first worm, means whereby said second worm may be actuated at a speed different from the speed of said first worm, and means to actuate said rotary impelling elements to effect discharge of plastic material from said conduit.

3. In apparatus for applying a plastic coating, the combination comprising a conduit for conveying plastic material, a pair of rotary impelling elements mounted at the discharge end of said conduit for receiving plastic material therefrom, means for driving said rotary impelling elements to effect discharge of plastic material from therebetween, a worm for advancing plastic material through said conduit in the direction of said rotary impelling elements, said worm being hollow through its center, a shaft nested within said worm, a second worm coaxial with said first named worm and mounted on said shaft, said second worm being located to receive plastic material from said first worm and to direct it against said rotary impelling elements, means to actuate said first worm and said second worm, and means for controlling relative speeds of said worms.

4. In apparatus for applying a plastic coating, the combination comprising a conduit for conveying plastic material, a pair of rotary impelling elements mounted at the discharge end of said conduit for receiving plastic material therefrom, means within said conduit for advancing material therethrough, said means including a worm, actuating means for driving said plastic material advancing means at a given speed, another worm within said conduit and located between said first mentioned means and said rotary impelling elements, actuating means for driving said other worm at such speed as to maintain a substantially constant pressure head on the plastic material being delivered thereby to said rotary impelling elements to effect elimination of pulsating flow of plastic material to said rotary impelling elements, and means for actuating said rotary impelling elements.

5. In apparatus for applying a plastic coating, the combination comprising a conduit for conveying plastic material, a pair of rotary impelling elements mounted at the discharge end of said conduit for receiving plastic material therefrom, each of said rotary impelling elements having a cylindrical material-engaging surface, worm means within said conduit for advancing material, actuating means for driving said worm means, means in said conduit intermediate said worm means and said rotary impelling elements for reducing the area of the cross-section of said conduit at its point of closest approach to the cylindrical surfaces of said rotary impelling elements whereby back pressure is built up on the plastic material being advanced to said rotary impelling elements, actuating means for driving said worm means at such speed as to maintain a substantially constant pressure head on the plastic material being delivered thereby and through said restrictive cross section to said rotary impelling elements, and means for actuating said rotary impelling elements.

6. In apparatus for applying a plastic coating, the combination comprising a conduit for conveying plastic material, a pair of rotary impelling elements mounted at the discharge end of said conduit for receiving plastic material therefrom, means within said conduit for advancing material therethrough, said means including a worm, actuating means for driving said plastic material advancing means at a given speed, pressure boosting means within said conduit and located between said first mentioned means and said rotary impelling elements, means in said conduit intermediate said pressure boosting means and said rotary impelling elements for reducing the area of the cross-section of said conduit at its point of closest approach to the surfaces of said rotary impelling elements, actuating means for driving said pressure boosting means at such a speed as to maintain a substantially constant pressure head on the plastic material being delivered thereby to said rotary impelling elements to effect elimination of pulsating flow of plastic material to said rotary impelling elements, and means for actuating said rotary impelling elements.

7. In apparatus for applying a plastic coating, the combination comprising a conduit for conveying plastic material, a pair of rotary impelling elements located at the discharge end of said conduit for receiving plastic material therefrom, each of said rotary impelling elements having a cylindrical material-engaging surface, means for actuating said rotary impelling elements for impelling plastic material from therebetween, a worm for advancing plastic material through said conduit and in the direction of said rotary impelling elements, said worm comprising a tube, means for supporting said worm exteriorly of said conduit, a second worm within said conduit and located between said first worm and said rotary impelling elements, said second worm being carried by a shaft extending through said first mentioned tube, means for supporting said shaft exteriorly of said conduit, and means for driving said first mentioned worm, and means whereby said second-mentioned worm may be driven at a speed different from the speed of said first-mentioned worm.

8. In apparatus for applying a plastic coating, the combination comprising a conduit for conveying plastic material, a pair of rotary impelling elements located at the discharge end of said conduit for receiving plastic material therefrom, means for actuating said rotary impelling elements, a worm for advancing plastic material through said conduit and in the direction of said rotary impelling elements, said worm being hollow through its center, means for supporting said worm exteriorly of said conduit, a second worm within said conduit and located between said first worm and said rotary impelling elements, said second worm being carried by a shaft extending through the center hollow of said first mentioned worm, said shaft being hollow and having openings at its free end, means having connection with said hollow shaft for introducing fluid material therein for delivery to and projection from said openings, means for supporting said shaft exteriorly of said conduit, and means for driving said first mentioned worm and said hollow shaft.

9. In apparatus for applying a plastic coating, the combination comprising a conduit for conveying plastic material, a pair of rotary impelling elements located at the discharge end of said conduit for receiving plastic material therefrom, a worm for advancing plastic material through said conduit in the direction of said rotary impelling elements, said worm comprising a tube, bearing means for said tube and worm, a second worm within said conduit and located between said first worm and said rotary impelling elements, said second worm being carried by a shaft extending through said first mentioned tube, said shaft being hollow and having openings at its free end, means having connection with said hollow shaft for introducing fluid material therein for delivery to and projection from said openings, bearing means for said shaft, means for driving said first and second mentioned worm, and means for adjusting the relative speeds of said first and second worms.

10. In apparatus for applying a plastic coating, the combination comprising a conduit for conveying plastic material, a pair of rotary impelling elements mounted at the discharge end of said conduit for receiving plastic material therefrom, a housing associated with the discharge end of said conduit and partially enclosing said rotary impelling elements, means supporting said rotary impelling elements independently of said housing and conduit, said means being movably mounted for enabling displacement of said rotary impelling elements from within said housing, worm means within said conduit for advancing plastic material through said conduit and toward said rotary impelling elements, means for supporting said worm means at a point outside of said conduit, and detachable means for enabling separation of a portion of said conduit from the remainder of said conduit to expose said worm means for cleaning purposes.

11. In apparatus for applying a plastic coating, the combination comprising a pair of rotary brushes for impelling plastic material from therebetween, means for actuating said impelling brushes, a conduit in which plastic material is conveyed to said impelling brushes, a housing at the discharge end of said conduit for partially enclosing said rotary brushes, said housing having a plate detachable therefrom on the side of said housing at which said actuating means is located, and means for mounting said rotary impelling brushes and plate to enable the withdrawal of said impelling brushes from within said housing.

12. In apparatus for applying a plastic coating, the combination comprising a pair of rotary brushes for impelling plastic material from therebetween, means for rotating said impelling brushes, a carriage upon which said brushes and said means for rotating the same are mounted, a housing partially enclosing said brushes, means for feeding plastic material to said brushes, means supporting said feeding means and housing in a fixed position relative to said carriage, and detachable means cooperating with said housing and said carriage for holding said brushes within said housing and whereby detachment may be effected for enabling separation of said brushes from said housing.

13. In apparatus for applying a plastic coating, the combination comprising a pair of rotary brushes for impelling plastic material, a conduit for conveying plastic material to said rotary brushes, a housing for receiving plastic material from said conduit and for partially enclosing said brushes, movable means for supporting said brushes, said means being removable from association with said housing for enabling said brushes to be removed therefrom, and means for rotating said brushes.

14. In apparatus for applying a plastic coating, the combination comprising a pair of rotary brushes for impelling plastic material, a conduit for conveying plastic material to said rotary brushes, a housing for receiving plastic material from said conduit and for partially enclosing said impelling elements, a carriage, means for mounting said rotary brushes on said carriage, means for securing said mounting means to said housing and conduit, said securing means being detachable for enabling said brushes to be moved with said carriage for removal from association with said housing and conduit, and means for rotating said rotary brushes for distributing plastic material received from said conduit.

15. In apparatus for applying a plastic coating, the combination comprising a conduit, said conduit having a circular cross-section, a pair of cylindrical brushes at the discharge end of said conduit, said brushes having a width greater than the diameter of said conduit and presenting portions of their peripheries to the discharge end of said conduit, means at the discharge end of said conduit for restricting its cross-section opposite the peripheries of said brushes to form an area of discharge of less height than the diameter of said conduit, and means for advancing plastic material through said conduit and restricted discharge area into contact with the uncovered portions of said brushes.

16. In apparatus for applying a plastic coating, the combination comprising a conduit having a circular cross-section, a pair of cylindrical brushes mounted opposite each other with each brush equally covering the discharge end of said conduit, means at the discharge end of said conduit for providing a reduced discharge opening for said conduit, said means comprising a pair of oppositely placed elements, each element having a varying cross-section and a surface generated by a line parallel to the axes of said cylindrical brushes with the points of closest approach of the generated surfaces to each other being towards the discharge end of said conduit whereby the plastic material passing therealong is directed inwards from the wall of said conduit, and means for advancing plastic material through said conduit and to the uncovered portions of the peripheries of said brushes.

BARTON WILLS.